US012615576B2

(12) United States Patent
Hong

(10) Patent No.: US 12,615,576 B2
(45) Date of Patent: Apr. 28, 2026

(54) INFORMATION TRANSMISSION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 450 days.

(21) Appl. No.: 18/013,872

(22) PCT Filed: Jul. 7, 2020

(86) PCT No.: PCT/CN2020/100725
§ 371 (c)(1),
(2) Date: Dec. 29, 2022

(87) PCT Pub. No.: WO2022/006759
PCT Pub. Date: Jan. 13, 2022

(65) Prior Publication Data
US 2023/0300722 A1 Sep. 21, 2023

(51) Int. Cl.
| | |
|---|---|
| *H04W 48/10* | (2009.01) |
| *H04W 68/02* | (2009.01) |
| *H04W 76/10* | (2018.01) |
| *H04W 88/06* | (2009.01) |

(52) U.S. Cl.
CPC ........... *H04W 48/10* (2013.01); *H04W 68/02* (2013.01); *H04W 76/10* (2018.02); *H04W 88/06* (2013.01)

(58) Field of Classification Search
CPC ..... H04W 48/10; H04W 68/02; H04W 76/10; H04W 88/06; H04W 68/00; H04W 48/12; H04W 76/40; H04W 48/18; H04W 72/04; H04L 5/0053; Y02D 30/70
See application file for complete search history.

(56) References Cited

U.S. PATENT DOCUMENTS

| | | | | |
|---|---|---|---|---|
| 11,743,128 | B2 * | 8/2023 | Rico Alvarino | ...... H04W 72/30 370/254 |
| 12,088,488 | B2 * | 9/2024 | Cui | ........................ H04W 72/21 |
| 12,238,783 | B2 * | 2/2025 | Narasimha | ........ H04W 72/0446 |
| 2014/0134970 | A1 * | 5/2014 | Pazos | ...................... H04W 4/90 455/404.1 |

(Continued)

FOREIGN PATENT DOCUMENTS

| | | |
|---|---|---|
| CN | 101453762 A | 6/2009 |
| CN | 101453779 A | 6/2009 |

(Continued)

OTHER PUBLICATIONS

CN101453779 A (Year: 2007).*

(Continued)

*Primary Examiner* — Nizar N Sivji
(74) *Attorney, Agent, or Firm* — Arch & Lake LLP

(57) ABSTRACT

A method for information transmission is performed by a user equipment (UE), including: receiving, by the UE, a message broadcasted by a base station and carrying transmission configuration information, the transmission configuration information being configured to indicate a correspondence between at least one service type and a radio access technology (RAT).

12 Claims, 4 Drawing Sheets

(56) References Cited

U.S. PATENT DOCUMENTS

| | | | |
|---|---|---|---|
| 2015/0312797 A1 | 10/2015 | Cui et al. | |
| 2019/0090181 A1* | 3/2019 | Iyer | H04W 24/08 |
| 2019/0274121 A1* | 9/2019 | Wu | H04L 5/0092 |
| 2021/0195405 A1* | 6/2021 | Gurumoorthy | H04W 48/10 |
| 2022/0123902 A1* | 4/2022 | Panteleev | H04L 1/1887 |
| 2022/0167448 A1* | 5/2022 | Palle | H04W 76/20 |

FOREIGN PATENT DOCUMENTS

| | | | | |
|---|---|---|---|---|
| CN | 103298046 A | 9/2013 | | |
| CN | 105101345 A | 11/2015 | | |
| EP | 2920990 A1 | 9/2015 | | |
| WO | WO-2020041990 A1 * | 3/2020 | | H04W 48/10 |
| WO | WO-2020140041 A1 * | 7/2020 | | H04L 41/40 |

OTHER PUBLICATIONS

Extended European Search Report issued in Application No. 20944389.
4, dated May 15, 2023,(10p).
International Search Report of PCT/CN2020/100725, dated Mar.
26, 2021, with English translation, (4p).

* cited by examiner

| user equipment （UE） | | base station |
|---|---|---|

201: receiving a message carrying transmission configuration information broadcast by a base station, in which, the transmission configuration information is configured to indicate a corresponding relationship between at least one service type and a radio access technology (RAT)

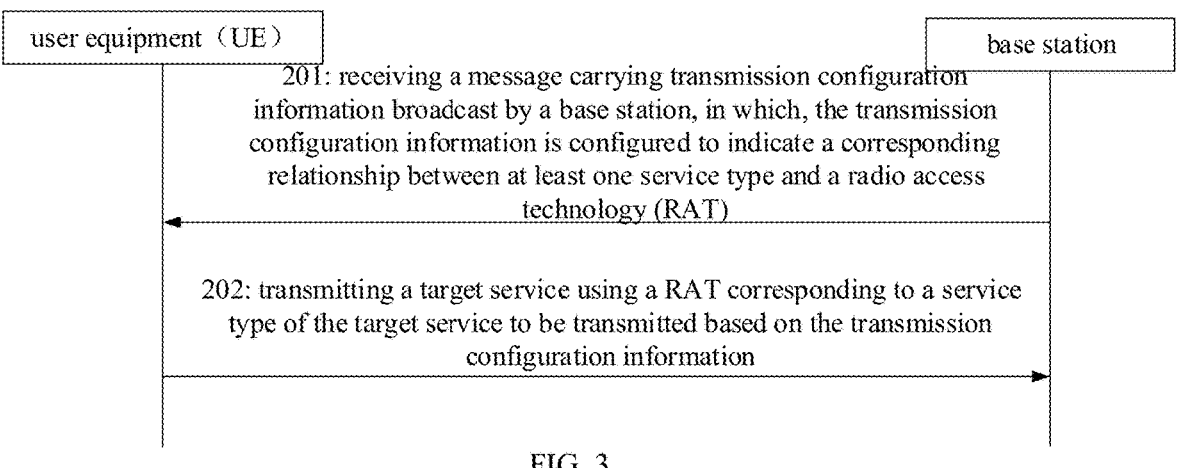

| user equipment (UE) | | base station |
| --- | --- | --- |

201: receiving a message carrying transmission configuration information broadcast by a base station, in which, the transmission configuration information is configured to indicate a corresponding relationship between at least one service type and a radio access technology (RAT)

202: transmitting a target service using a RAT corresponding to a service type of the target service to be transmitted based on the transmission configuration information

FIG. 3

| user equipment (UE) | base station |
| --- | --- |

401: broadcasting a message carrying transmission configuration information, in which, the transmission configuration information is configured to indicate a corresponding relationship between at least one service type and a radio access technology (RAT)

FIG. 4

| user equipment (UE) | base station |
| --- | --- |

401: broadcasting a message carrying transmission configuration information, in which, the transmission configuration information is configured to indicate a corresponding relationship between at least one service type and a radio access technology (RAT)

402: transmitting a target service using a RAT corresponding to a service type of the target service to be transmitted determined based on the transmission configuration information

FIG. 5 apparatus 200 for information transmission first sending module 210 sending submodule 211 second transmission module 220 second transmission submodule 221 second sending module 230

INFORMATION TRANSMISSION METHOD AND APPARATUS

CROSS-REFERENCE TO RELATED APPLICATION

This application is the US national phase application of International Application No. PCT/CN2020/100725, filed on Jul. 7, 2020, the entire content of which is incorporated herein by reference for all purposes.

TECHNICAL FIELD

The present disclosure relates to but not limited to a field of wireless communication technologies, and particularly to a method and an apparatus for information transmission, a communication device and a storage medium.

BACKGROUND

At present, standardized work of a 5th generation (5G) cellular mobile communication has been completed. With deployment and improvement of a 5G network, more and more mobile phone manufacturers launch a 5G mobile phone. In the development and use process of the 5G mobile phone, it is found that a power consumption of the 5G mobile phone is much larger than a power consumption of a 4G mobile phone under circumstance of running the same communication service. The 5G mobile phone is usually multi-modal, that is, the 5G mobile phone may be backwards compatible with 4G and 3G cellular mobile communication networks.

SUMMARY

According to a first aspect of the present disclosure, a method for information transmission is provided, which is performed by a user equipment (UE). The method includes:

receiving a message carrying transmission configuration information broadcast by a base station, in which, the transmission configuration information is configured to indicate a corresponding relationship between at least one service type and a radio access technology (RAT).

According to a second aspect of the present disclosure, a method for information transmission is provided, which is performed by a base station. The method includes:

broadcasting a message carrying transmission configuration information, in which, the transmission configuration information is configured to indicate a corresponding relationship between at least one service type and a radio access technology (RAT).

According to a third aspect of the present disclosure, a communication device is provided, and includes:

a processor; and a memory coupled to the processor, in which, the memory is stored with a computer executable program for information transmission, the computer executable program being executed to cause the processor to implement steps of the method for information transmission as described in the first aspect or in the second aspect.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, illustrate embodiments in conformity with the present disclosure, and explain the principle of embodiments of the present disclosure together with the specification.

FIG. 3 is a flowchart illustrating another method for information transmission according to an embodiment;

FIG. 4 is a flowchart illustrating another method for information transmission according to an embodiment;

FIG. 5 is a flowchart illustrating another method for information transmission according to an embodiment;

DETAILED DESCRIPTION

The embodiments will be described in detail here, and examples thereof are shown in the accompanying drawings. When the following descriptions refer to the accompanying drawings, unless otherwise indicated, the same numbers in different drawings represent the same or similar elements. The implementations described in the following embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms "a/an", "said" and "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, second information may also be referred to as first information. It depends on the context. For example, the word "if" as used herein may be interpreted as "in a case that" or "when" or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figures 1, 2:
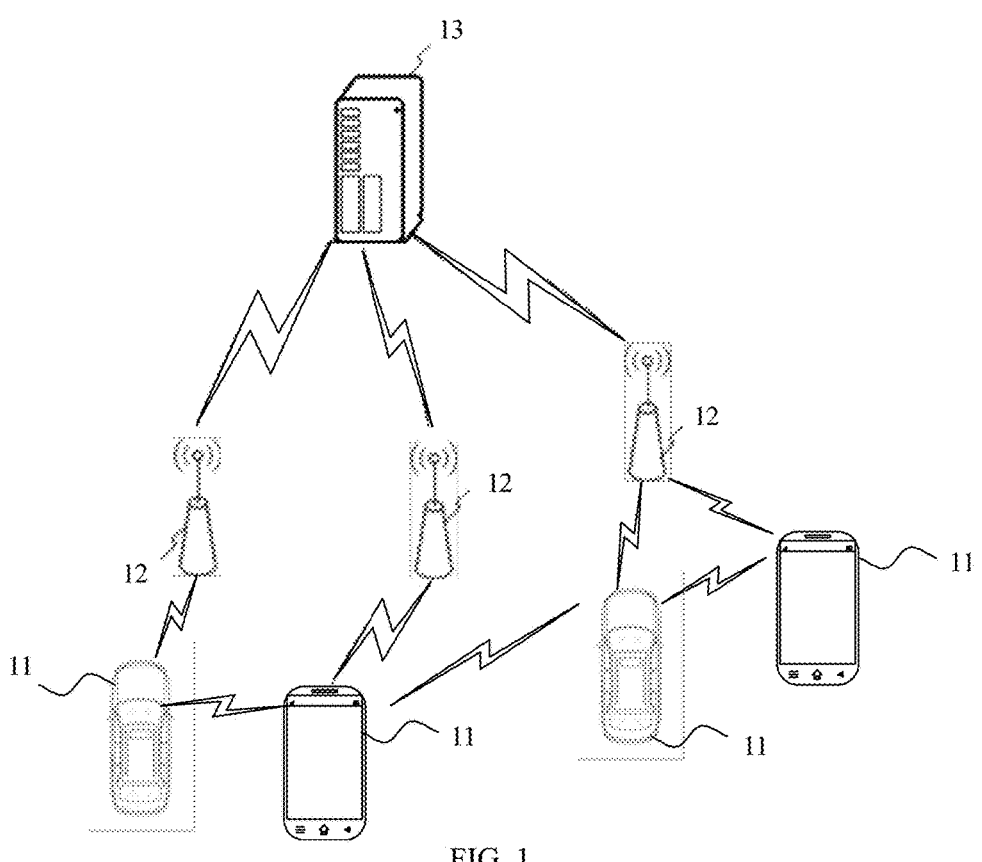
FIG. 1 is a diagram illustrating a structure of a communication system according to an embodiment.
FIG. 2 is a flowchart illustrating a method for information transmission according to an embodiment.

FIG. 1 is a diagram illustrating a structure of a wireless communication system in embodiments of the present disclosure. As illustrated in FIG. 1, the wireless communication system is a communication system based on a cellular mobile communication technology. The wireless communication system may include several terminals 11 and several base stations 12.

The terminal 11 may refer to a device that provides voice and/or data connectivity for a user. The terminal 11 may communicate with one or more core networks through a radio access network (RAN). The terminal 11 may be an internet of things (IoT) terminal, for example, a sensor device, a mobile phone (or referred to as a cellular phone) and a computer having an internet of things terminal, for example, may be a fixed, portable, compact, handheld, computer built-in or vehicle apparatus. For example, a station (STA), a subscriber unit, a subscriber station, a mobile station, a mobile, a remote station, an access point, a remote terminal, an access terminal, a user terminal, a user agent, a user device or a user equipment (UE). Alternatively, the terminal 11 may be a device of an unmanned vehicle. Alternatively, the terminal 11 also may be a vehicle device, for example, may be a vehicle computer with a wireless communication function, or a wireless a wireless communication device externally connected to a vehicle computer. Alternatively, the terminal 11 also may be a roadside device, for example, may be a street lamp, a signal lamp or other roadside device with a wireless communication function.

The base station 12 may be a network side device in a wireless communication system. The wireless communication system may be a 4th generation mobile communication (4G) system, also referred to as a long term evolution (LTE) system; or the wireless communications system may be a 5G system, also referred to as a new radio (NR) system or a 5G NR system. Alternatively, the wireless communication system may be a next generation system of a 5G system. An access network in a 5G NR system may be referred to as a new generation-radio access network (NG-RAN) or an MTC system.

The base station 12 may be an eNB adopted in a 4G system. Alternatively, the base station 12 may be a base station with a centralized distributed architecture (gNB) in a 5G system. When the base station 12 adopts a centralized distributed architecture, it generally includes a central unit (CU) and at least two distributed units (DU). Protocol stacks at a Packet Data Convergence Protocol (PDCP) layer, a Radio Link Control (RLC) layer and a Media Access Control (MAC) layer are configured in a CU; a physical (PHY) layer protocol is configured in a DU. The specific implementation of a base station 12 is not limited in embodiments of the disclosure.

The base station 12 may establish a wireless connection with the terminal 11 via a radio interface. In different implementations, the wireless air interface is a wireless air interface based on a 4G standard; or, the wireless air interface is a wireless air interface based on a 5G standard, for example, the wireless air interface is a new air interface; or, the wireless air interface may be a wireless air interface based on a next generation mobile communication network technology standard of a 5G.

In some embodiments, an end to end (E2E) connection further may be established between terminals 11. It may be applied to scenes such as vehicle to vehicle (V2V) communication, vehicle to infrastructure (V2I) communication and vehicle to pedestrian (V2P) communication in vehicle to everything (V2X).

In some embodiments, the wireless communication system may further include a network management device 13.

Several base stations 12 may be connected with a network management device 13. The network management device 13 may be a core network device in a wireless communication system, for example, the network management device 13 may be a mobility management entity (MME) in an evolved packet core (EPC). Or, the network management device may be other core network devices, for example, a Serving GateWay (SGW), a Public Data Network GateWay (PGW), a Policy and Charging Rules Function (PCRF) or a Home Subscriber Server (HSS), etc. The implementation form of the network management device 13 is not limited in the embodiments of the disclosure.

The executive body involved in embodiments of the present disclosure includes but not limited to a user equipment (UE) such as a mobile phone compatible with at least one RAT of 5G, 4G, 3G and 2G, and a base station, etc.

As illustrated in FIG. 2, a method for information transmission is provided in the embodiment, which may be applied to a user equipment (UE) for wireless communication. The method includes the following steps.

At step 201, a message carrying transmission configuration information broadcast by a base station is received. The transmission configuration information is configured to indicate a corresponding relationship between at least one service type and a radio access technology (RAT).

The UE may be a mobile terminal that supports at least one RAT. For example, the UE may be compatible with a 5G RAT, a 4G RAT, 3G RAT and a 2G RAT at the same time.

Different types of services may be different types of communication services defined based on the requirements such as a mobile communication network transmission rate, a bit error rate, and/or a delay.

For example, different types of services may include an Internet access service, a video service, an FTP download service, a voice service, etc.

Different mobile communication networks accessed by different radio access technologies may satisfy the requirements of different types of services.

For example, the 4G RAT may satisfy the requirements of the Internet access service and the FTP download service for the network transmission rate, the 5G RAT may satisfy the requirement of the video service for the network transmission rate, and the 2G RAT may satisfy the voice service for the network transmission rate, etc. Different communication services use corresponding RATs, which may reduce excess in the capability of the wireless communication network, thereby reducing power consumptions of the UE and the base station.

The message carrying transmission configuration information may include: a system message or an RRC signaling, etc.

The transmission configuration information may indicate RATs corresponding to different types of services. The UE may determine RATs corresponding to different types of services based on the transmission configuration information. The UE may autonomously select to use a RAT corresponding to the service for transmission, or may determine a RAT for transmission based on its own capability.

For example, the transmission configuration information may be agreed by a communication protocol, and the transmission configuration information agreed by the communication protocol may indicate a 4G RAT used by the Internet access service and the FTP download service, a 5G RAT used by the video service, and a 2G RAT used by the voice service, etc.

On one hand, corresponding RATs are configured for different types of services, to satisfy the requirements of different services for transmission resources, which may enhance a transmission quality, reduce a resource surplus or a resource waste, and improve a utilization rate of resources. On the other hand, the RATs corresponding to the different types of services are indicated by transmission configuration information, so that the UE selects different RATs for transmission of the different types of services, and the UE is no longer limited to transmission of the different types of services by one RAT, which may improve flexibility the UE selects the RAT.

In an alternative embodiment, the transmission configuration information may further include a transmission configuration associated with the RAT corresponding to the at least one service type.

That is, different transmission configurations of the same RAT may correspond to different service subtypes. For example, a high-throughput video service type (a high-definition video) and a low-delay video service type (for example, live broadcast) in the video service correspond to the 5G RAT based on the transmission configuration information. Further, a transmission configuration satisfying a high throughput requirement may be allocated to the high-throughput video service type based on the transmission configuration information, for example, more antenna port resources, more time-frequency resources, etc.; and a higher communication priority and a higher resource scheduling priority may be allocated to the low-delay video service type.

In an embodiment, receiving the message carrying the transmission configuration information broadcast by the base station, includes:

receiving a system information block (SIB) carrying the transmission configuration information broadcast by the base station.

The base station may send the transmission configuration information carried in the system information to the UE by broadcasting the system information before the UE accesses the base station. The UE may receive the broadcast system information before establishing a connection with the base station, determine RATs corresponding to different service types, and establish a communication connection with the base station based on the transmission configuration information.

The base station may use the existing SIB to carry the transmission configuration information, or may add a new SIB to carry the transmission configuration information.

The UE may perform service transmission using the RAT corresponding to the service type after completing access, without switching the RAT after access, thereby reducing the communication complexity.

In an embodiment, the transmission configuration information is carried in a reserved bit in the SIB.

The base station may use the existing SIB to carry the transmission configuration information. The base station may use the reserved bit in the existing SIB to carry the transmission configuration information. The UE may read the transmission configuration information of the reserved bit when receiving the SIB, and then determine RATs corresponding to the different types of services.

Information configuration information is carried in the reserved bit of the SIB. On one and, information amount carried in the SIB is increased, which improves a utilization efficiency of the SIB. On the other hand, a new SIB does not need to be added, which reduces a complexity of a communication process caused due to adding the new SIB.

In an embodiment, as illustrated in FIG. 3, the method further includes the following steps.

At step 202, a target service is transmitted using a RAT corresponding to a service type of the target service to be transmitted based on the transmission configuration information.

The target service to be transmitted may include an uplink service and a downlink service. The UE may determine RATs corresponding to different types of services based on the transmission configuration information. When there is a communication service between the UE and the base station, the UE and the base station may establish a communication connection using the RAT corresponding to the service, and transmit the service.

For example, the transmission configuration information indicates that an FTP download service uses a 4G RAT. When there is an FTP download service between the UE and the base station, the UE and the base station may establish a communication connection using the 4G RAT, and transmit the FTP download service by the communication connection established.

On one hand, a RAT adapted to a service type is selected to establish a communication connection and perform data transmission, which may reduce a resource waste caused due to excess of a communication connection performance. On the other hand, a RAT with a lower power consumption is used to establish a communication network and transmit communication services of different service types, which may reduce the power consumption of the UE and the base station and save the power of the UE.

In an embodiment, transmitting the target service using the RAT corresponding to the service type of the target service to be transmitted, includes:

establishing an RRC connection with the RAT corresponding to the service type of the target service, and transmitting the target service based on the RRC connection, in response to the UE being in an idle state or a non-activated state.

When the UE is in the idle state or the non-activated state, the UE needs to establish an RRC connection with the base station first in response to there being the uplink service to be transmitted or there being the downlink service to be received. The UE needs to determine a RAT used based on the service type of the uplink service, establishes the RRC connection with the base station based on the determined RAT, and performs data transmission of the uplink service. The base station may use downlink service types such as a broadcast message or a paging message before transmitting the downlink service. The UE determines a RAT used based on the service type of the downlink service, establishes the RRC connection with the base station based on the determined RAT, and performs data transmission of the downlink service. For example, when the UE needs to initiate a voice service when in the idle state or the non-activated state, the UE may determine that the voice service may use a 2G RAT based on an indication of transmission configuration information. The UE may initiate a random access using the 2G RAT, and establish an RRC connection with the base station, and then initiate the voice service.

In an embodiment, the method further includes:

receiving a paging message in response to the UE being in the idle state or the non-activated state; the paging message includes a service type of a target service to be transmitted; the service type is configured to determine a RAT for transmitting the target service.

When a network side needs to send a downlink target service to the UE, the base station may carry information of the target service in the paging message, for example, a type indication of the service type of the target service, and the UE needs to check the type indication first when receiving the paging message, and determines a RAT corresponding to the service type of the target service based on the type indication, and initiates the RRC connection using the RAT, and then starts data transmission of the target service.

In an embodiment, the service type is defined based on a quality of service flow identifier (QFI).

QoS management is a control mechanism that a network satisfies service quality requirements, and QoS requirements of different services are different. Services with different QoS requirements may be transmitted using different RATs.

A QoS flow is a minimum granularity of QoS control, and each QoS flow is identified with one QoS flow ID (QFI). Service types of different services may be determined based on the QFI, and RATs that satisfy the QoS requirements may be selected corresponding to different types of services.

The service type is defined by the QFI, and the RAT is determined based on the QFI, which may be that corresponding RATs satisfy the transmission requirements of different types of services.

As illustrated in FIG. 4, a method for information transmission is provided in the embodiment, which may be applied to a base station for wireless communication. The method includes the following steps.

At step 401, a message carrying transmission configuration information is broadcast. The transmission configuration information is configured to indicate a corresponding relationship between at least one service type and a radio access technology (RAT).

A UE may be a mobile terminal that supports at least one RAT. For example, the UE may be compatible with a 5G RAT, a 4G RAT, 3G RAT and a 2G RAT at the same time.

Different types of services may be different service types of communication services defined based on the requirements such as a mobile communication network transmission rate, a bit error rate, and/or a delay.

For example, different types of services may include an Internet access service, a video service, an FTP download service, a voice service, etc.

Different mobile communication networks accessed by different radio access technologies may satisfy the requirements of different types of services.

For example, the 4G RAT may satisfy the requirements of the Internet access service and the FTP download service for the network transmission rate, the 5G RAT may satisfy the requirement of the video service for the network transmission rate, and the 2G RAT may satisfy the voice service for the network transmission rate, etc. Different communication services use RATs corresponding to different communication services, which may reduce excess in the capability of the wireless communication network, thereby reducing power consumptions of the UE and the base station.

The message carrying transmission configuration information may include: a system message or an RRC signaling, etc.

The transmission configuration information may indicate RATs corresponding to different types of services. The UE may determine RATs corresponding to different types of services based on the transmission configuration information. The UE may autonomously select to use a RAT corresponding to the service for transmission, or may determine a RAT for transmission based on its own capability.

For example, the transmission configuration information may be agreed by a communication protocol, and the transmission configuration information agreed by the communication protocol may indicate a 4G RAT used by the Internet access service and the FTP download service, a 5G RAT used by the video service, and a 2G RAT used by the voice service, etc.

On one hand, corresponding RATs are configured for different types of services, to satisfy the requirements of different services for transmission resources, which may enhance the transmission quality, reduce the resource surplus or the resource waste, and improve the utilization rate of resources. On the other hand, the RATs corresponding to the different types of services are indicated by transmission configuration information, so that the UE selects different RATs for transmission of the different types of services, and the UE is no longer limited to transmission of the different types of services by one RAT, which may improve the flexibility the UE selects the RAT.

In an alternative embodiment, the transmission configuration information may further include a transmission configuration associated with the RAT corresponding to the at least one service type.

That is, different transmission configurations of the same RAT may correspond to different service subtypes. For example, a high-throughput video service type (a high-definition video) and a low-delay video service type (for example, live broadcast) in the video service correspond to the 5G RAT based on the transmission configuration information. Further, a transmission configuration satisfying a high throughput requirement may be allocated to the high-throughput video service type based on the transmission configuration information, for example, more antenna port resources, more time-frequency resources, etc.; and a higher communication priority and a higher resource scheduling priority may be allocated to the low-delay video service type.

In an embodiment, broadcasting the message carrying the transmission configuration information, includes:

broadcasting a system information block (SIB) carrying the transmission configuration information.

The base station may send the transmission configuration information carried in the system information to the UE by broadcasting the system information before the UE accesses the base station. The UE may receive the broadcast system information before establishing a connection with the base station, determine RATs corresponding to different service types, and establish a communication connection with the base station based on the transmission configuration information.

The base station may use the existing SIB to carry the transmission configuration information, or may add a new SIB to carry the transmission configuration information.

The UE may perform service transmission using the RAT corresponding to the service type after completing access, without switching the RAT after access, thereby reducing the communication complexity.

In an embodiment, the transmission configuration information is carried in a reserved bit in the SIB.

The base station may use the existing SIB to carry the transmission configuration information. The base station may use the reserved bit in the existing SIB to carry the transmission configuration information. The UE may read the transmission configuration information of the reserved bit when receiving the SIB, and then determine RATs corresponding to the different types of services.

Information configuration information is carried in the reserved bit of the SIB. On one and, information amount carried in the SIB is increased, which improves the utilization efficiency of the SIB. On the other hand, a new SIB does not need to be added, which reduces the complexity of the communication process caused due to adding the new SIB.

In an embodiment, as illustrated in FIG. 5, the method further includes the following steps.

At step 402, a target service is transmitted using a RAT corresponding to a service type of the target service to be transmitted determined based on the transmission configuration information.

The target service to be transmitted may include an uplink service and a downlink service. The UE may determine RATs corresponding to different types of services based on the transmission configuration information. When there is a communication service between the UE and the base station, the UE and the base station may establish a communication connection using the RAT corresponding to the service, and transmit the service.

For example, the transmission configuration information indicates that an FTP download service uses a 4G RAT. When there is an FTP download service between the UE and the base station, the UE and the base station may establish a communication connection using the 4G RAT, and transmit the FTP download service by the communication connection established.

On one hand, the RAT adapted to the service type is selected to establish a communication connection and perform data transmission, which may reduce the resource waste caused due to excess of the communication connection performance. On the other hand, the RAT with a lower power consumption is used to establish a communication network and transmit communication services of different service types, which may reduce the power consumption of the UE and the base station and save the power of the UE.

In an embodiment, transmitting the target service using the RAT corresponding to the service type of the target service to be transmitted determined based on the transmission configuration information, includes:

establishing an RRC connection with the RAT corresponding to the service type of the target service, and transmitting the target service based on the RRC connection, based on a request of a UE.

When the UE is in the idle state or the non-activated state, the UE needs to establish the RRC connection with the base station first in response to there being the uplink service to be transmitted or there being the downlink service to be received. The UE needs to determine a RAT used based on the service type of the uplink service, establishes the RRC connection with the base station based on the determined RAT, and performs data transmission of the uplink service. The base station may use downlink service types such as a broadcast message or a paging message before transmitting the downlink service. The UE determines a RAT used based on the service type of the downlink service, establishes the RRC connection with the base station based on the determined RAT, and performs data transmission of the downlink service. For example, when the UE needs to initiate a voice service when in the idle state or the non-activated state, the UE may determine that the voice service may use a 2G RAT based on an indication of transmission configuration information. The UE may initiate a random access using the 2G RAT, and establish an RRC connection with the base station, and then initiate the voice service.

In an embodiment, the method further includes:

sending a paging message for a UE in the idle state or the non-activated state; the paging message includes a service type of a target service to be transmitted; the service type is configured to determine a RAT for transmitting the target service.

When a network side needs to send a downlink target service to the UE, the base station may carry information of the target service in the paging message, for example, a type indication of the service type of the target service, and the UE needs to check the type indication first when receiving the paging message, and determines a RAT corresponding to the service type of the target service based on the type indication, and initiates the RRC connection using the RAT, and then starts data transmission of the target service.

In an embodiment, the service type is defined based on a quality of service flow identifier (QFI).

QoS management is a control mechanism that a network satisfies service quality requirements, and QoS requirements of different services are different. Services with different QoS requirements may be transmitted using different RATs.

A QoS flow is a minimum granularity of QoS control, and each QoS flow is identified with one QoS flow ID (QFI). Service types of different services may be determined based on the QFI, and RATs that satisfy the QoS requirements may be selected corresponding to different types of services.

The service type is defined by the QFI, and the RAT is determined based on the QFI, which may be that corresponding RATs satisfy the transmission requirements of different types of services.

A specific example is provided in combination with the above any embodiment.

A method for information transmission is provided in the example.

The base station broadcasts connection configuration information of the RATs corresponding to the different types of services configured by a 5G multi-modal terminal via system information.

For example, the base station may broadcast an Internet access service of the 5G multi-modal terminal is transmitted with the 4G RAT, a video service is transmitted with the 5G RAT, an FTP download service is transmitted with the 4G RAT, and a voice service is transmitted with the 2G RAT, etc.

Specifically, the connection configuration information may be configured by modifying an existing SIB signaling. Alternatively, it may be configured by adding a new SIB signaling.

Different services may be distinguished by different QFIs.

When the 5G multi-modal terminal is connected to the base station, the 5G multi-modal terminal may read the related system information carrying connection configuration information.

When the 5G multi-modal terminal in the idle state needs to initiate the uplink service, it checks the service type first, and then transmits a corresponding service on a corresponding RAT based on the connection configuration information of the base station.

When the network needs to send the downlink service to the 5G multi-modal terminal, service information may be included in the paging message, and the 5G multi-modal terminal needs to check the service information first when receiving the paging message, and determines to initiate the RRC connection on the corresponding RAT based on the service information and starts service transmission.

Figures 6, 7:
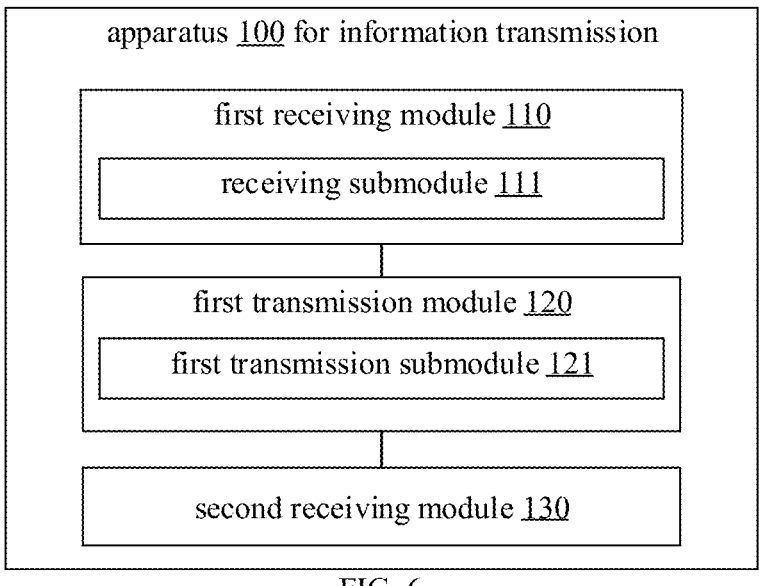
FIG. 6 is a block diagram illustrating an apparatus for information transmission according to an embodiment.
FIG. 7 is a block diagram illustrating another apparatus for information transmission according to an embodiment.

An apparatus for information transmission is further provided in embodiments of the present disclosure, which is applied to a user equipment. As illustrated in FIG. 6, the apparatus 100 for information transmission includes a first receiving module 110.

The first receiving module 110 is configured to receive a message carrying transmission configuration information broadcast by a base station. The transmission configuration information is configured to indicate a corresponding relationship between at least one service type and a radio access technology (RAT).

In an embodiment, the first receiving module 110, includes a receiving submodule 111.

The receiving submodule 111 is configured to receive a system information block (SIB) carrying the transmission configuration information broadcast by the base station.

In an embodiment, the transmission configuration information is carried in a reserved bit in the SIB.

In an embodiment, the transmission configuration information further includes a transmission configuration associated with the RAT corresponding to the at least one service type.

In an embodiment, the apparatus further includes a first transmission module 120.

The first transmission module 120 is configured to transmit a target service using the RAT corresponding to the service type of the target service to be transmitted based on the transmission configuration information.

In an embodiment, the first transmission module 120, includes a first transmission submodule 121.

The first transmission submodule 121 is configured to establish an RRC connection with the RAT corresponding to the service type of the target service, and transmit the target service based on the RRC connection, in response to the UE being in an idle state or a non-activated state.

In an embodiment, the apparatus further includes a second receiving module 130.

The second receiving module 130 is configured to receive a paging message in response to the UE being in the idle state or the non-activated state; the paging message includes a service type of a target service to be transmitted; the service type is configured to determine a RAT for transmitting the target service.

In an embodiment, the service type is defined based on a quality of service flow identifier (QFI).

An apparatus for information transmission is further provided in embodiments of the present disclosure, which is applied to a base station for wireless communication. As illustrated in FIG. 7, the apparatus 200 for information transmission includes a first sending module 210.

The first sending module 210 is configured to broadcast a message carrying transmission configuration information. The transmission configuration information is configured to indicate a corresponding relationship between at least one service type and a radio access technology (RAT).

In an embodiment, the first sending module 210 includes a sending submodule 211.

The sending submodule 211 is configured to broadcast a system information block (SIB) carrying the transmission configuration information.

In an embodiment, the transmission configuration information is carried in a reserved bit in the SIB.

In an embodiment, the transmission configuration information further includes a transmission configuration associated with the RAT corresponding to the at least one service type.

In an embodiment, the apparatus 200 further includes a second transmission module 220.

The second transmission module 220 is configured to transmit a target service using a RAT corresponding to a service type of the target service to be transmitted determined based on the transmission configuration information.

In an embodiment, the second transmission module 220, includes a second transmission submodule 221.

The second transmission submodule 221 is configured to establish an RRC connection with the RAT corresponding to the service type of the target service, and transmit the target service based on the RRC connection, based on a request of a UE.

In an embodiment, the apparatus 200 further includes a second sending module 230.

The second sending module 230 is configured to send a paging message for a UE in an idle state or a non-activated state; the paging message includes the service type of the target service to be transmitted; the service type is configured to determine a RAT for transmitting the target service.

In an embodiment, the service type is defined based on a quality of service flow identifier (QFI).

In an embodiment, the first receiving module 110, the first transmission module 120, the second receiving module 130, the first sending module 210, the second transmission module 220 and the second sending module 230, etc. may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), universal processors, controllers, micro controller units (MCUs), microprocessors or other electronic components, or may be implemented in combination with one or more radio frequency (RF) antennas, to perform the above method.

Figure 8:
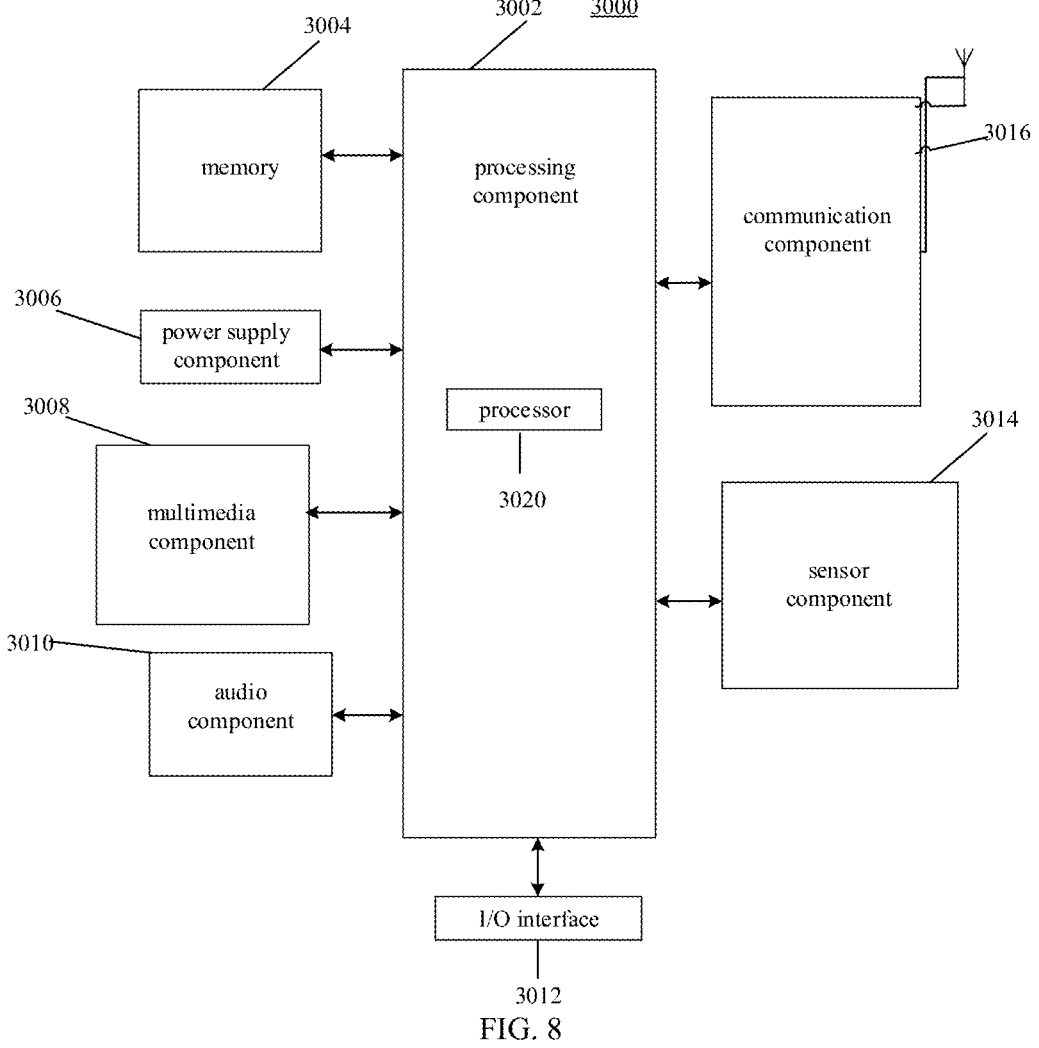
FIG. 8 is a block diagram illustrating a device for information transmission according to an embodiment.

FIG. 8 is a block diagram illustrating a device 3000 for information transmission according to an embodiment. For example, the device 3000 may be a mobile phone, a computer, a digital broadcasting terminal, a messaging device, a game console, a tablet device, a medical equipment, a fitness equipment, a personal digital assistant, etc.

As illustrated FIG. 8, the device 3000 may include one or more components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the whole operation of the device 3000, such as the operations related to display, phone call, data communication, camera operation and recording operation. The processing component 3002 may include one or more processors 3020 to perform instructions, to complete all or part of steps of the above method. In addition, the processing component 3002 may include one or more modules for the convenience of interaction between the processing component 3002 and other components. For example, the processing component 3002 may include a multimedia module for the convenience of interaction between the multimedia component 3008 and the processing component 3002.

The memory 3004 is configured to store all types of data to support the operation of the device 3000. Examples of the data include the instructions of any applications or methods operated on the device 3000, contact data, phone book data, messages, pictures, videos, etc. The memory 3004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 3006 may provide power supply for all components of the device 3000. The power supply component 3006 may include power supply management system, a or more power supplies, and other units related to generating, managing and distributing power for the device 3000.

The multimedia component 3008 includes an output interface screen provided between the device 3000 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touching or sliding operation. In some embodiments, the multimedia component 3008 includes a front camera and/or a rear camera. When the device 3000 is in an operation mode, such as a shooting mode or a video mode, the front camera or the rear camera may receive external multimedia data. Each front camera and rear camera may be a fixed optical lens system or an optical lens system with a focal length and an optical zoom capacity.

The audio component 3010 is configured as an output and/or input signal. For example, the audio component 3010 includes a microphone (MIC). When the device 3000 is in an operation mode, such as a call mode, a record mode, and a speech recognition mode, the microphone is configured to receive external audio signals. The audio signals received may be further stored in the memory 3004 or sent via the communication component 3016. In some embodiments, the audio component 3010 further includes a speaker configured to output an audio signal.

The I/O interface 3012 provides an interface for the processing component 3002 and the peripheral interface module, and the peripheral interface module may be a keyboard, a click wheel, a button, etc. The buttons may include but not limited to a home button, a volume button, a start button and a lock button.

The sensor component 3014 includes one or more sensors, configured to provide various aspects of status assessment for the device 3000. For example, the sensor component 3014 may detect the on/off state of the apparatus for 3000 and the relative positioning of the component. For example, the component is a display and a keypad of the device 3000. The sensor component 3014 may further detect the location change of the device 3000 or one component of the device 3000, the presence or absence of contact between the user and the device 3000, the orientation or acceleration/deceleration of the device 3000, and the temperature change of the device 3000. The sensor component 3014 may include a proximity sensor, which is configured to detect the existence of the objects nearby without any physical contact. The sensor component 3014 may further include a light sensor such as a CMOS or CCD image sensor, which is configured in imaging applications. In some embodiments, the sensor component 3014 may further include an acceleration transducer, a gyroscope sensor, a magnetic sensor, a pressure sensor or a temperature sensor.

The communication component 3016 is configured for the convenience of wire or wireless communication between the device 3000 and other devices. The device 3000 may access wireless networks based on communication standard, such as WiFi, 2G or 3G, or their combination. In an embodiment, the communication component 3016 receives broadcast signals or broadcast-related information from an external broadcast management system via a broadcast channel. In an embodiment, the communication component 3016 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In an embodiment, the device 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an embodiment, a non-transitory computer readable storage medium including instructions is further provided, such as the memory 3004 including instructions. The instructions may be executed by the processor 3020 of the device 3000 to complete the above methods. For example, the non-transitory computer readable storage medium may be a ROM, a random access memory (RAM), a CD-ROM, a magnetic tape, a floppy disk, an optical data storage device, etc.

After considering the specification and practicing the disclosure herein, those skilled in the art will easily think embodiment of other implementations. The present application is intended to cover any variations, usages, or adaptive changes of the present disclosure. These variations, usages, embodiment or adaptive changes follow the general principles of the present disclosure and include common knowledge or conventional technical means in the technical field embodiment not disclosed by the present disclosure. The description and the embodiments are to be regarded as exemplary only, and embodiment the true scope and spirit of the present disclosure are given by the appended claims.

It should be understood that the present invention is not limited to the precise structure described above and shown in the drawings, and various modifications and changes may be made without departing from its scope. The scope of embodiments of the present disclosure is only limited by the appended claims.

What is claimed is:

1. A method for information transmission, comprising:
receiving, by a radio transceiver of a user equipment (UE) via a wireless interface, a message carrying transmission configuration information broadcast by a base station, storing, in a local memory, the transmission configuration information configured to indicate a corresponding relationship between at least one service type and a radio access technology (RAT);
receiving, by the radio transceiver of the UE via the wireless interface, a paging message in response to the UE being in an idle state or an inactivated state, wherein the paging message comprises a service type of a target service to be transmitted, and the service type is configured to determine an RAT for transmitting the target service;
determining a target-generation RAT for transmitting the target service depending on at least one of transmission rate, bit error rate, or delay corresponding to the service type in the paging message and the transmission configuration information in the message, wherein the target-generation RAT at least comprises a second-generation RAT, a third-generation RAT, a fourth-generation RAT, or a fifth-generation RAT; and
establishing a radio resource control (RRC) connection with the determined target-generation RAT, and transmitting, via the wireless interface, the target service based on the RRC connection, in a case where the UE is in an idle state or an inactivated state.

2. The method according to claim 1, wherein receiving the message carrying the transmission configuration information broadcast by the base station, comprises:
receiving a system information block (SIB) carrying the transmission configuration information broadcast by the base station.

3. The method according to claim 2, wherein the transmission configuration information is carried in a reserved bit in the SIB.

4. The method according to claim 1, wherein the transmission configuration information further comprises a transmission configuration associated with the RAT corresponding to the at least one service type.

5. The method according to claim 1, wherein the service type is defined based on a quality of service flow identifier (QFI).

6. A method for information transmission, comprising:
broadcasting, by a base station, a message carrying transmission configuration information, wherein the transmission configuration information is configured to indicate a corresponding relationship between at least one service type and a radio access technology (RAT);
sending, by the base station, a paging message for a UE in an idle state or an inactivated state, wherein the paging message comprises a service type of a target service to be transmitted, and the service type is configured to determine an RAT for transmitting the target service; and
establishing a radio resource control (RRC) connection with a target-generation RAT determined depending on at least one of transmission rate, bit error rate, or delay corresponding to the service type in the paging message and the transmission configuration information carried in the message, and transmitting the target service based on the RRC connection, based on a request from the UE, wherein the target-generation RAT at least comprises a second-generation RAT, a third-generation RAT, a fourth-generation RAT, or a fifth-generation RAT.

7. The method according to claim 6, wherein broadcasting the message carrying the transmission configuration information comprises:

broadcasting a system information block (SIB) carrying the transmission configuration information.

8. The method according to claim 7, wherein the transmission configuration information is carried in a reserved bit in the SIB.

9. The method according to claim 6, wherein the transmission configuration information further comprises a transmission configuration associated with the RAT corresponding to the at least one service type.

10. The method according to claim 6, wherein the service type is defined based on a quality of service flow identifier (QFI).

11. A user equipment, comprising:
a processor; and
a memory coupled to the processor, wherein, the memory is configured to store stored with a computer executable program for information transmission, the computer executable program being executed to cause the processor to:
receive a message carrying transmission configuration information broadcast by a base station, wherein, the transmission configuration information is configured to indicate a corresponding relationship between at least one service type and a radio access technology (RAT);
receive a paging message in response to the UE being in an idle state or an inactivated state, wherein the paging message comprises a service type of a target service to be transmitted, and the service type is configured to determine an RAT for transmitting the target service;
determine a target-generation RAT for transmitting the target service depending on at least one of transmission rate, bit error rate, or delay corresponding to the service type in the paging message and the transmission configuration information carried in the message, wherein the target-generation RAT at least comprises a second-generation RAT, a third-generation RAT, a fourth-generation RAT, or a fifth-generation RAT; and
establish a radio resource control (RRC) connection with the determined target-generation RAT, and transmit the target service based on the RRC connection, in a case where the user equipment is in an idle state or an inactivated state.

12. A base station, configured to implement the method of claim 6, comprising:
a processor; and
a memory, configured to store instructions executable by the processor.

* * * * *